US 6,736,539 B2

(12) United States Patent
Brezovnik et al.

(10) Patent No.: US 6,736,539 B2
(45) Date of Patent: May 18, 2004

(54) HOUSEHOLD APPLIANCE

(75) Inventors: Peter Brezovnik, Mozirje (SI); Henrik Pavlovic, Ljubno ob Savinji (SI); Jurij Pesec, Petrovce (SI); Igor Zibret, Smartno ob Paki (SI)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 0 days.

(21) Appl. No.: 10/261,192

(22) Filed: Sep. 30, 2002

(65) Prior Publication Data
US 2003/0076739 A1 Apr. 24, 2003

Related U.S. Application Data

(63) Continuation of application No. PCT/EP01/02086, filed on Feb. 23, 2001.

(30) Foreign Application Priority Data
Mar. 31, 2000 (DE) .......................... 100 16 330

(51) Int. Cl.⁷ .............. B01F 9/00; A23L 1/00; A23N 1/00; A47J 43/08; A47J 44/00
(52) U.S. Cl. .............. 366/349; 366/205; 366/314; 99/348; 310/50; 310/89
(58) Field of Search ............ 366/205, 347, 366/349, 314, 601, 279, 331; 310/50, 89; 99/348, 492

(56) References Cited

U.S. PATENT DOCUMENTS

| 4,783,173 | A | * | 11/1988 | Artin ........................ 366/205 |
| 5,048,402 | A | * | 9/1991 | Letournel et al. ............ 99/348 |
| 6,593,674 | B2 | * | 7/2003 | Sanchez et al. .............. 310/89 |
| 6,640,694 | B2 | * | 11/2003 | Brezovnik et al. .......... 366/205 |

FOREIGN PATENT DOCUMENTS

| DE | 30 45 088 A1 | 7/1982 |
| EP | 0 570 685 A1 | 11/1993 |

* cited by examiner

Primary Examiner—Tony G. Soohoo
(74) Attorney, Agent, or Firm—Laurence A. Greenberg; Werner H. Stemer; Ralph E. Locher

(57) ABSTRACT

A household appliance, in particular, a kitchen machine, includes a planetary gear disposed between an electric drive unit and an output shaft or drive shaft of the appliance and the stationary toothed ring of which is supported on the housing of the appliance by support arms (13) projecting radially outwardly on the outer circumference of the toothed ring. Good damping of the noise originating from the planetary gear is achieved by virtue of the fact that an elastic element preventing direct contact between the support arms and the fixing locations is respectively inserted between the support arms and the fixing locations on the housing.

26 Claims, 3 Drawing Sheets

HOUSEHOLD APPLIANCE

CROSS-REFERENCE TO RELATED APPLICATION

This application is a continuation of copending International Application No. PCT/EP01/02086, filed Feb. 23, 2001, which designated the United States and was not published in English.

BACKGROUND OF THE INVENTION

Field of the Invention

The invention relates to a household appliance with a housing having at least two housing parts and with a gearing that is driven by an electric drive unit and is fastened to one and/or the other housing part.

In a kitchen machine (specifically, a Siemens MK3 kitchen machine) available on the market, a planetary gear is disposed above a gearwheel driven through a toothed belt by the drive motor of the machine. Radially outwardly facing projections, which serve for fixing the toothed ring to the housing of the machine, are formed on the outer circumference of the stationary toothed ring of this planetary gear. These projections are connected rigidly to the housing. As a result, the noise originating from the planetary gear is transmitted out of the housing virtually undamped.

SUMMARY OF THE INVENTION

It is accordingly an object of the invention to provide a household appliance household appliance with a housing having at least two housing parts and with a gearing driven by an electric drive unit and is fastened to one and/or the other housing part that overcomes the hereinaforementioned disadvantages of the heretofore-known devices of this general type and that is improved using simple constructional measures such that transmission of the noise originating from a gearing to the housing of the household appliance is prevented at least to a very great extent.

With the foregoing and other objects in view, there is provided, in accordance with the invention, a household appliance, including a housing with at least two housing parts having fixing locations, a gearing to be fastened to one of the at least two housing parts, an electric drive unit driving the gearing, and an at least very nearly vibration-damping element fastening the gearing to at least one fixing location on at least one of the at least two housing parts and preventing direct contact between the at least one fixing location and the one of the at least two housing parts.

According to the invention, such noise reduction is achieved by virtue of the fact that, for fixing the gearing to the fixing location or the fixing locations, a vibration-damping element is inserted, which at least very nearly prevents direct contact between the housing parts and the fixing location or the fixing locations.

The vibration-damping element inserted at the fixing location or the fixing locations brings about, in a cost-effective manner, substantial damping of the vibrations that originate from the fixed gearing and cause noise. Moreover, such a noise-deadening measure can be handled simply in the production process and can be fitted positionally accurately at the fixing locations of the housing very rapidly.

In accordance with another feature of the invention, the gearing has, for its fixing, support arms with receivers, on which the vibration-damping elements can be disposed as an intermediate layer between the housing parts serving for fixing the gearing.

In accordance with a further feature of the invention, particularly purposeful and effective isolation of the gearing from the housing parts is achieved by the fixing arms, which bear the gearing, in interaction with the damping bodies disposed between these arms and the housing fixing locations.

In accordance with an added feature of the invention, especially production-friendly and positionally accurate mounting of the vibration-damping elements for isolating the gearing from the housing parts is brought about if the receivers are configured as at least very nearly vertically disposed holding pins, on which a tube-like, vibration-damping element is fitted positively and/or non-positively, the elements being insertable into receivers on the housing parts, which receivers are adapted to their outer contour.

In accordance with an additional feature of the invention, the isolation of the gearing from the housing parts is especially strong and effective if a holding pin is provided respectively on both sides on the support arms, onto which pin a tubular part of an elastomeric material and serving as a vibration-damping element is pushed. The tube shell of the tubular part is inserted into tubular pieces disposed on both housing parts.

In accordance with yet another feature of the invention, especially simple mounting and positionally accurate support of the vibration-damping elements is brought about if the receivers are configured as tubular connection pieces that are disposed at least very nearly vertically on the support arms and into which a vibration-damping element of tube-like construction is inserted positively or non-positively, the elements being capable of being fitted together with holding pins disposed on the housing parts.

In accordance with yet a further feature of the invention, a tubular connection piece is provided respectively on both sides on the support arms, into which piece a tubular part of an elastomeric material and serving as a vibration-damping element is inserted. The tube opening of the tubular part can be pushed onto holding pins disposed on both housing parts.

On account of their constructional shape, the tubular parts inserted into the tubular connection pieces have a very soft characteristic so that especially strong damping of the vibration originating from the gearing takes place.

By virtue of the holding pins provided on the housing parts, assembly of the support arms bearing the gearing with the housing parts is considerably improved and, consequently, can be carried out with a significantly reduced time requirement as well. Moreover, the support arms also already achieve a certain vibration damping. Furthermore, preassembly of the support arms with the vibration-damping elements can be carried out especially simply and rapidly.

The support arms provided for supporting the gearing can themselves contribute to the vibration damping if, in accordance with yet an added feature of the invention, the support arms are provided with a U-shaped bend. On account of the U-shaped bend, the support arms already have a certain elasticity that has a favorable effect on the vibration damping.

With the objects of the invention in view, there is also provided a kitchen machine, including a housing having an upper housing part having at least one upper fixing location, and a lower housing part having at least one lower fixing location, a gearing assembly having support arms with receivers, a stationary toothed ring connected to one of the upper housing part and the lower housing part by the support arms, and a planetary gear, an electric drive driving the planetary gear, and a vibration-damping element fastening the gearing assembly to a fixing location selected from at least one of the at least one upper fixing location and the at least one lower fixing location, and preventing direct contact between the fixing location and a respective one of the upper housing part and the lower housing part.

In accordance with yet an additional feature of the invention, the vibration-damping element is a plurality of vibration-damping elements respectively disposed at each of the receivers as an intermediate layer between the fixing location and a respective one or both of the upper housing part and the lower housing part.

In accordance with again another feature of the invention, noise damping that is especially advantageous in cost terms and effective for a kitchen machine, such as a mixer, with an electric drive for driving a planetary gear and a housing having an upper housing part and a lower housing part. The planetary gear has a stationary toothed ring that is fixed to the upper housing part and/or the lower housing part by support arms, is achieved if the support arms are configured according to the invention.

An additional measure serving for further improvement of the noise damping lies in the toothed ring being, moreover, held by a mounted-on holding ring of an elastic material in an annular collar configured on the upper part of the housing.

In accordance with again a further feature of the invention, the toothed ring is connected to the planetary gear and the electric drive is connected to the toothed ring for driving the planetary gear.

With the objects of the invention in view, there is also provided a household appliance, including a housing with housing parts each having fixing locations, a gearing disposed in the housing, an electric drive unit driving the gearing and disposed in the housing, and a vibration-damping element fastening the gearing to at least one of the fixing locations on at least one of the housing parts and preventing direct contact between the gearing and the one of the housing parts, the vibration-damping element substantially reducing vibration of the gearing.

With the objects of the invention in view, there is also provided a household appliance, including a housing with at least two housing parts each having fixing locations, a gearing disposed in the housing, an electric drive unit driving the gearing and disposed in the housing, and a vibration-damping element fastening the gearing to at least one of the fixing locations on at least one of the at least two housing parts and preventing direct contact between the gearing and the one of the at least two housing parts, the vibration-damping element substantially reducing vibration of the gearing.

With the objects of the invention in view, there is also provided a household appliance, including a housing with housing parts each having fixing locations, a gearing disposed in the housing, an electric drive unit driving the gearing and disposed in the housing, and a vibration-damping element fastening the gearing to at least one fixing location on two of the housing parts and preventing direct contact between the gearing and the two housing parts, the vibration-damping element substantially reducing vibration of the gearing.

With the objects of the invention in view, there is also provided a household appliance, including a housing having housing parts including a first housing part having a first fixing location, a second housing part having a second fixing location, a gearing disposed in the housing, an electric drive unit driving the gearing and disposed in the housing, and a vibration-damping element fastening the gearing to the first and second fixing locations and preventing direct contact between the gearing and the first and second fixing locations, the vibration-damping element substantially reducing vibration of the gearing.

Other features that are considered as characteristic for the invention are set forth in the appended claims.

Although the invention is illustrated and described herein as embodied in a household appliance, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
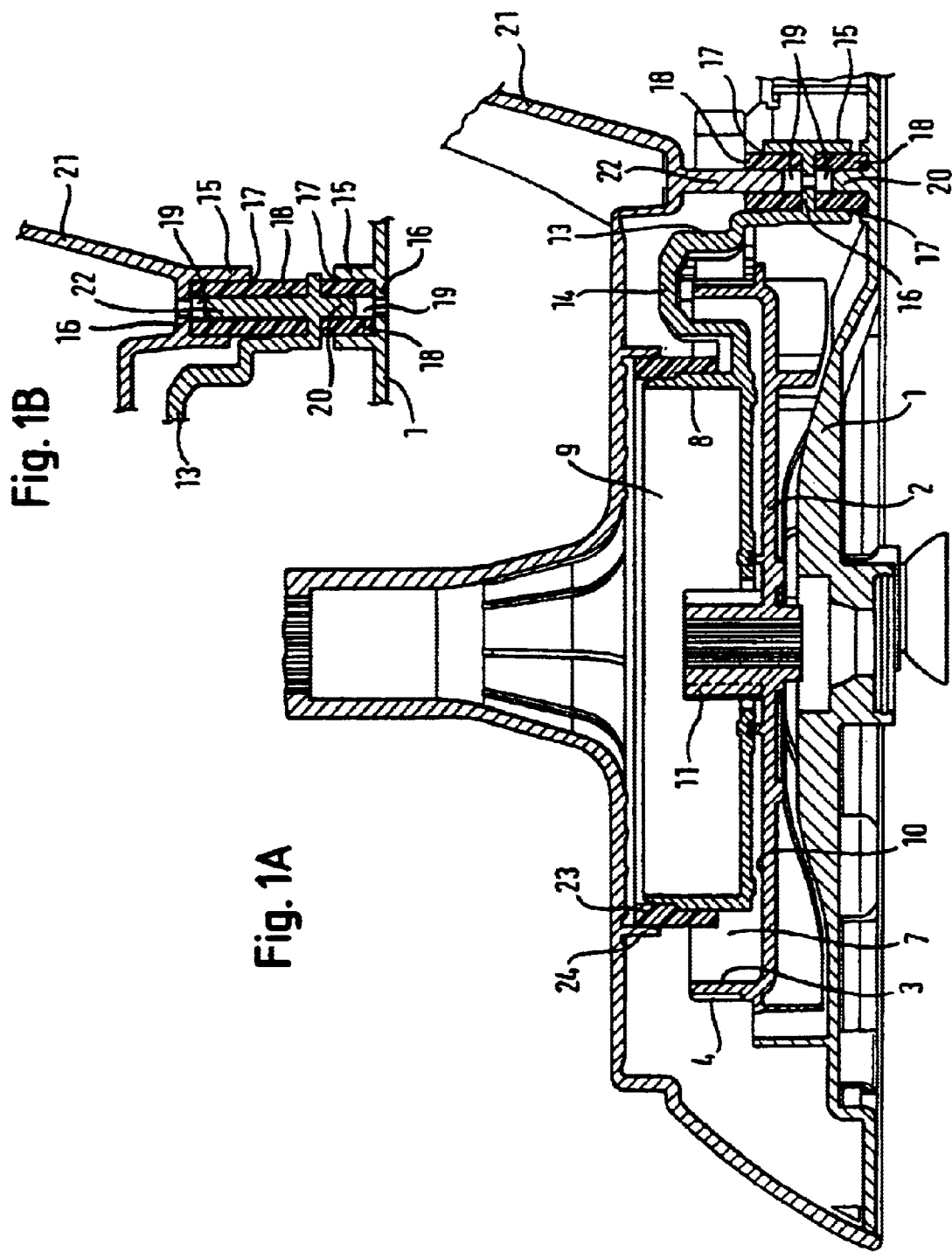
FIG. 1A is a fragmentary, cross-sectional view of a configuration of a stationary toothed ring of a planetary gear on a lower housing part of a kitchen machine according to the invention.
FIG. 1B is a fragmentary, enlarged view of a portion of FIG. 1A illustrating an alternative embodiment of the housing part to gearing connection.
Figure 2:
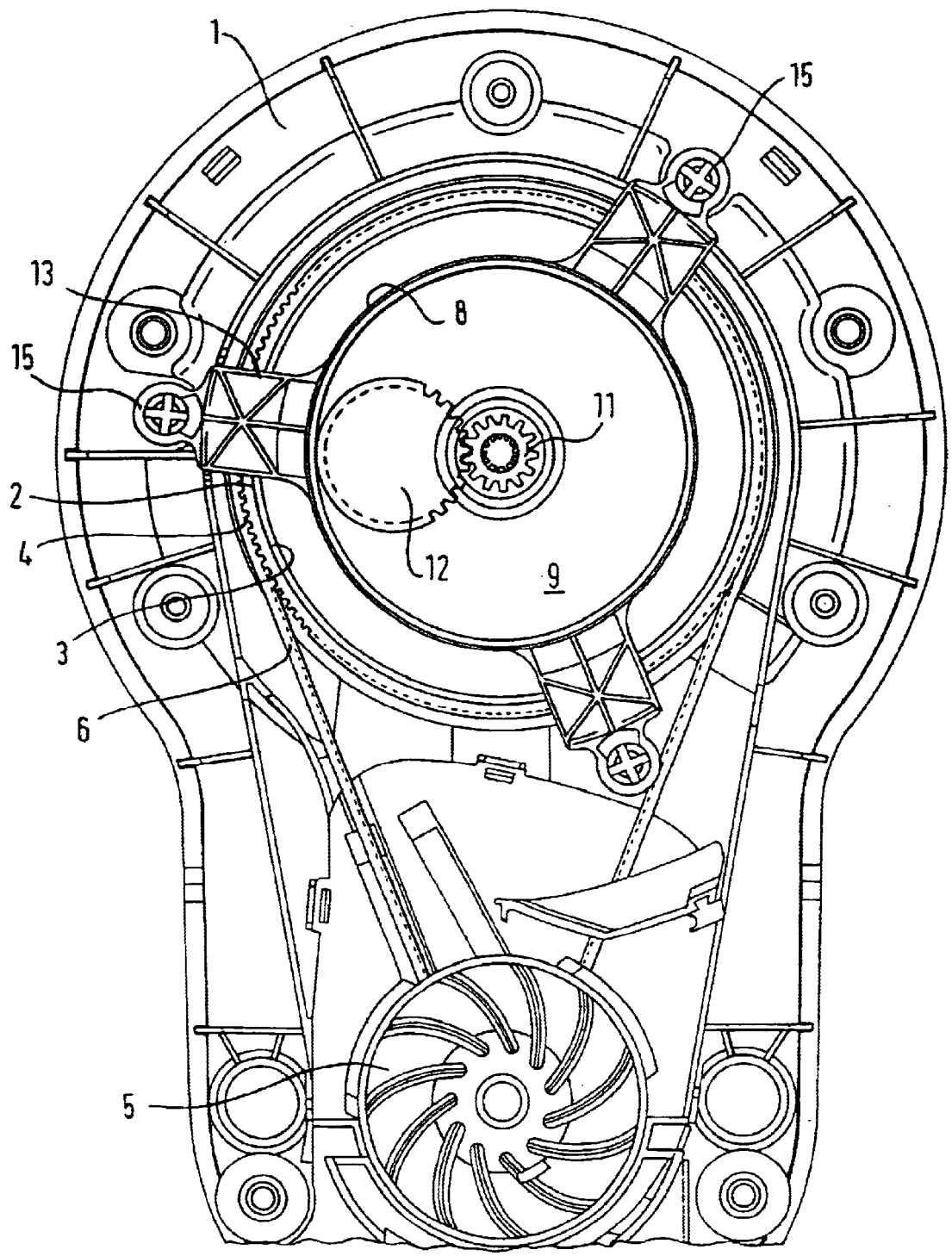
FIG. 2 is a fragmentary, plan view from above the configuration of FIG. 1A with a top cover part removed.
Figure 3:
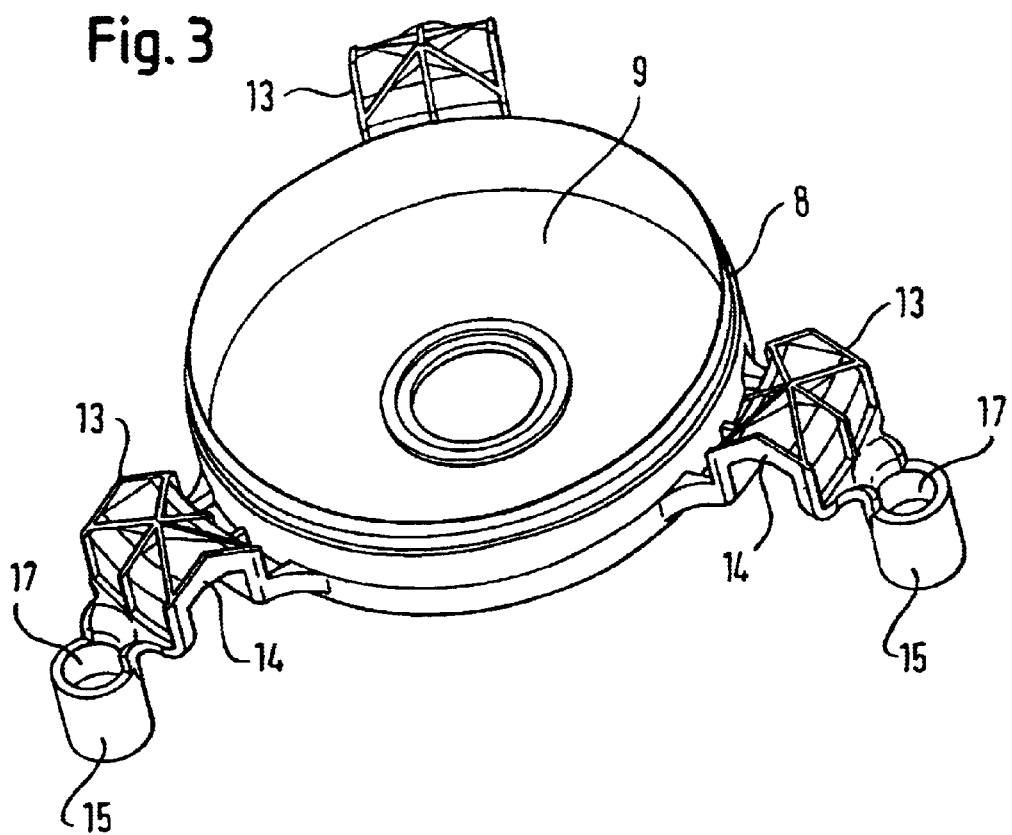
FIG. 3 is a perspective view from the top of the stationary toothed ring of FIGS. 1 and 2.
Figure 4:
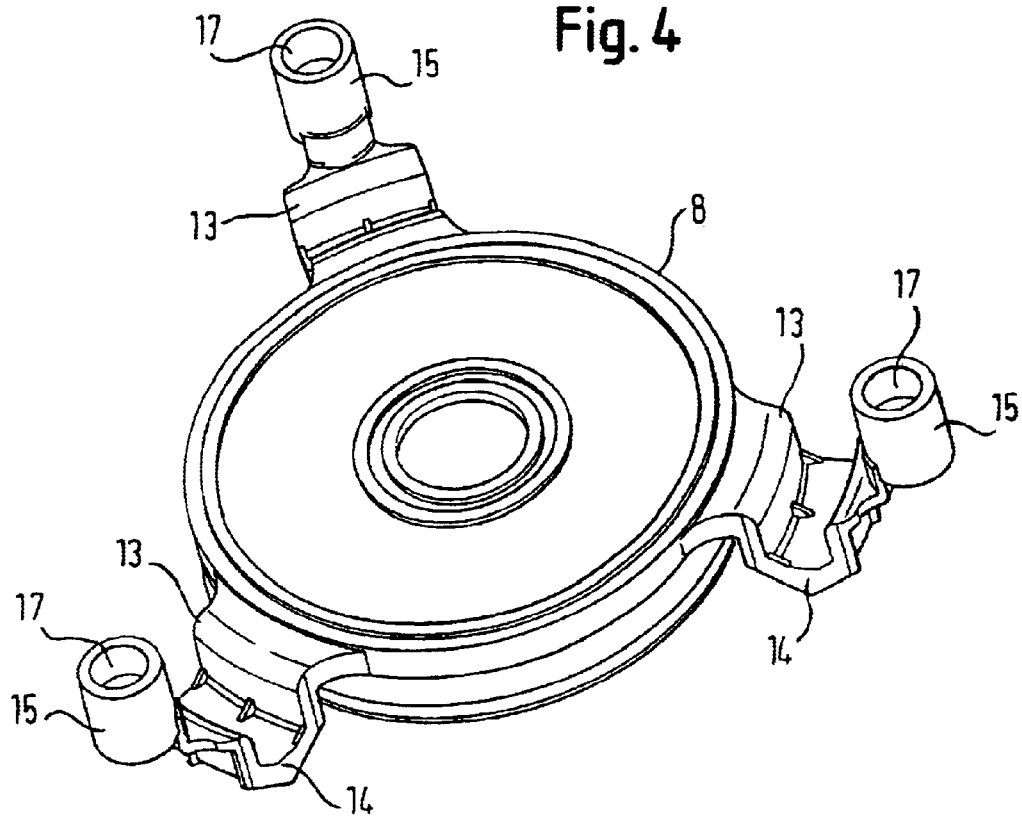
FIG. 4 is a perspective view from the bottom of the stationary toothed ring of FIGS. 1 and 2.

Referring now to the figures of the drawings in detail and first, particularly to FIGS. 1A, 1B, and 2 thereof, there is shown a lower housing part 1 of a kitchen machine, which can be a mixer. Mounted rotatably on the lower housing part 1 is a pot-shaped gearwheel 2. An external toothing 4 for a toothed belt 6 driven by the drive motor 5 of the kitchen machine is present on the pot shell 3 of the gearwheel 2. The stationary toothed ring 8 of a planetary gear (see, in particular, FIGS. 3 and 4) is disposed in the pot space 7 of the gearwheel 2. Disposed in the inner space 9 of the toothed ring 8 are several planet wheels 12 that are driven through a sun wheel 11 formed on in the middle of the pot bottom 10 of the gearwheel 2, only one of which being illustrated in FIG. 2. Three radially outwardly projecting support arms 13 are formed with uniform circumferential spacing on the outer side of the toothed ring 8. The support arms 13 have a U-shaped bend 14, with which they extend over the pot shell 3 of the gearwheel 2. Located at the free end of the support arms 13 are sleeve-shaped fixing elements 15 that have an intermediate bottom 16 in the interior. The sleeve-shaped fixing elements 15, consequently, form two mutually opposite receivers 17, in the form of a tubular connection piece, into which a tubular part 18 of an elastic material is inserted respectively.

The tubular part 18 inserted into the receiver 17 directed toward the lower housing part 1 is pushed through its tube opening 19 onto a pin 20 formed on the lower housing part 1. As such, the toothed ring 8 is held on the lower housing part 1. At the same time, contact of rigid parts of the support arms 13, and, consequently, of the toothed ring 8, with rigid parts of the housing 1, that is to say, the pins 20, is avoided by the elastic tubular part 18. Due to such an isolation of rigid parts, excellent noise damping is brought about by the elastic tubular part 18.

The upper housing part 21 of the kitchen machine is, through holding pins 22 formed thereon, inserted into the tube opening 19 of the tubular part 18 inserted into the upper receiver 17. The upper housing part 21 is, thus, also separated from the toothed ring 8 with regard to vibration so that noise can be transmitted to the upper housing part 21 as well in only a strongly damped form. The noise damping overall is, thus, further improved. On account of the geometrical shape of the tubular parts 18, these parts 18 have an especially soft characteristic. According to which brings about especially good noise damping.

As an alternative to the fixing elements 15 having receivers 17, as shown in FIG. 1A, pins 20, 22 can be located at the free end of the support arms 13. These pins 20, 22, consequently, form two mutually opposite holders on which a tubular part 18 of an elastic material is inserted respectively.

Sleeve-shaped fixing elements 15, each having a bottom 16 in the interior thereof, are respectively disposed at the lower and upper housing parts 1, 21. The sleeve-shaped fixing elements 15, consequently, form two mutually opposite receivers 17, in the form of a tubular connection piece, into which the tubular part 18 of an elastic material is inserted respectively.

The lower tubular part 18 inserted into the lower receiver 17 and, upon connection to the supporting arm 13, receives, through its tube opening 19, the lower pin 20 formed on the support arm 13. As such, the toothed ring 8 is held on the lower housing part 1. At the same time, contact of rigid parts of the support arms 13, and, consequently, of the toothed ring 8, with rigid parts of the housing 1, that is to say, the pins 20, is avoided by the elastic tubular part 18. Due to such an isolation of rigid parts, excellent noise damping is brought about by the elastic tubular part 18.

The upper housing part 21 of the kitchen machine receives, through fixing element 15 formed thereon, the tubular part 18 into the upper receiver 17. When the upper housing part 21 is connected to the supporting arm 13, the upper pin 22 is inserted into the tube opening 19 of the upper tubular part 18. The upper housing part 21 is, thus, also separated from the toothed ring 8 with regard to vibration so that noise can be transmitted to the upper housing part 21 as well in only a strongly damped form. The noise damping overall is, thus, further improved.

A holding ring 23 of an elastic material is also fitted on the outer side of the toothed ring 8. When the upper housing part 21 has been put on, the holding ring 23 fits into an annular collar 24 provided on the upper housing part 21. As such, further elastic support and, in particular, good centering also of the toothed ring 8 are brought about. The toothed ring 8 is, thus, isolated vibrationally elastically from both the lower and the upper housing parts 1, 21.

In addition, the complete elastic isolation of the drive parts from the housing parts 1, 21 of the kitchen machine brings about a smoothing of the starting torque when the drive motor 5 is switched on. When the drive motor 5 starts, the starting jolt acts, first of all, on the elastic elements, in particular, on the tubular parts 18. As a result, the parts 18 are stressed initially. Only then does the rotary movement of the gearing parts begin. Such damping of the starting jolt is very desirable for protection of the drive motor 5.

We claim:

1. A household appliance, comprising:
   a housing with at least two housing parts having fixing locations;
   a gearing to be fastened to at least one of said at least two housing parts;
   an electric drive unit driving said gearing; and
   a vibration-damping element fastening said gearing to at least one of said fixing locations on said at least one housing part and preventing direct contact between said at least one fixing location and said gearing.

2. The household appliance according to claim 1, wherein:
   said gearing has support arms with receivers; and
   said vibration-damping element is disposed at said receivers as an intermediate layer between said at least one fixing location and said one of said at least two housing parts and fixes said gearing.

3. The household appliance according to claim 1, wherein:
   said gearing has support arms with receivers; and
   said vibration-damping element is a plurality of vibration-damping elements respectively disposed at each of said receivers as an intermediate layer between said at least one fixing location and said one of said at least two housing parts, said vibration-damping elements fixing said gearing.

4. The household appliance according to claim 3, wherein:
   said one of said at least two housing parts has substantially vertically disposed holding pins;
   said vibration-damping elements:
      are tube-shaped and have an outer contour;
      are fitted at least one of positively and non-positively on said pins; and
      are inserted into said receivers; and said receivers have an inner contour adapted to said outer contour.

5. The household appliance according to claim 4, wherein:
   said support arms each have two sides;
   a holder is respectively provided on each of said two sides on said support arms;
   said tubular vibration-damping elements:
      are of an elastomeric material;
      are inserted into a respective holder; and
      are pushed onto a respective one of said pins on said one of said at least two housing parts.

6. The household appliance according to claim 3, wherein:
   said receivers on said support arms are substantially vertically disposed tubular connection pieces;
   said one of said at least two housing parts has holding pins; and
   said vibration-damping elements:
      are tube-shaped;
      are one of positively and non-positively inserted into said receivers; and
      are fitted on said holding pins.

7. The household appliance according to claim 3, wherein:
   said support arms each have two sides with a respective one of said receivers:
   said receivers are substantially vertically disposed tubular connection pieces;
   said at least two housing parts each have holding pins: and said vibration-damping elements:
   are of an elastomeric material;
   are tube-shaped with a tube opening fitted on said holding pins; and
   said elements are inserted into said tubular connection pieces.

8. The household appliance according to claim 7, wherein said elements are one of positively and non-positively inserted into said tubular connection pieces.

9. The household appliance according to claim 3, wherein each of said support arms has a U-shaped bend.

10. The household appliance according to claim 1, wherein:
   said gearing has support arms with holders; and
   said vibration-damping element is a plurality of vibration-damping elements respectively disposed at each of said holders as an intermediate layer between said holders and said at least one fixing location, said vibration-damping elements fixing said gearing.

11. The household appliance according to claim 10, wherein:
   said holders are substantially vertically disposed holding pins;
   said one of said at least two housing parts has receivers;
   said vibration-damping elements:
      are tube-shaped and have an outer contour;
      are fitted at least one of positively and non-positively on said pins; and
      are inserted into said receivers; and
   said receivers have an inner contour adapted to said outer contour.

12. The household appliance according to claim 11, wherein
   each of said at least two housing parts has receivers;
   said support arms each have two sides;
   said pins are respectively provided on each of said two sides of said support arms;
   said tubular vibration-damping elements:
      are of an elastomeric material;
      are inserted into a respective ones of said receivers; and
      are pushed onto a respective one of said pins on said support arms.

13. household appliance according to claim 10, wherein:
   said one of said at least two housing parts has substantially vertically disposed tubular connection pieces;
   said holders are holding pins; and
   said vibration-damping elements:
      are tube-shaped;
      are one of positively and non-positively inserted into said tubular connection pieces; and
      are fitted on said holding pins.

14. The household appliance according to claim 10, wherein:
   said holders are substantially vertically disposed holding pins:
   said support arms each have two sides each with a respective one of said pins
   said at least two housing parts each have substantially vertically disposed tubular connection pieces;
   said vibration-damping elements:
      are of an elastomeric material;
      are tube-shaped with a tube opening fitted on said pins; and
      said elements are inserted into said tubular connection pieces.

15. The household appliance according to claim 14, wherein said vibration-damping elements are one of positively and non-positively inserted into said tubular connection pieces.

16. A kitchen machine, comprising:
   a housing having:
      an upper housing part having at least one upper fixing location; and
      a lower housing part having at least one lower fixing location;
   a gearing assembly having:
      support arms with receivers;
      a stationary toothed ring connected to one of said upper housing part and said lower housing part by said support arms; and
      a planetary gear;
   an electric drive driving said planetary gear; and
   a vibration-damping element:
      fastening said gearing assembly to a fixing location selected from at least one of:
         said at least one upper fixing location; and
         said at least one lower fixing location; and
      preventing direct contact between said fixing location and a respective one of said upper housing part and said lower housing part.

17. The kitchen machine according to claim 16, wherein said vibration-damping element is a plurality of vibration-damping elements respectively disposed at each of said receivers as an intermediate layer between said fixing location and a respective one of said upper housing part and said lower housing part.

18. The kitchen machine according to claim 16, wherein said vibration-damping element is a plurality of vibration-damping elements respectively disposed at each of said receivers as an intermediate layer between said fixing location and both of said upper housing part and said lower housing part.

19. The kitchen machine according to claim 16, wherein the kitchen machine is a kitchen mixer.

20. The household appliance according to claim 16, wherein:
   said upper housing part has an annular collar; and
   a mounted-on holding ring of an elastic material supports said toothed ring in said annular collar.

21. The household appliance according to claim 16, wherein:
   said upper housing part has an annular collar; and an elastic folding ring supports said toothed ring in said annular collar.

22. The household appliance according to claim 16, wherein:
   said toothed ring is connected to said planetary gear; and
   said electric drive is connected to said toothed ring for driving said planetary gear.

23. A household appliance, comprising:
   a housing with housing parts each having fixing locations;
   a gearing disposed in said housing;
   an electric drive unit driving said gearing and disposed in said housing; and
   a vibration-damping element fastening said gearing to at least one of said fixing locations on at least one of said housing parts and preventing direct contact between said gearing and said at least one of said housing parts, said vibration-damping element substantially reducing vibration of said gearing.

24. A household appliance, comprising:
a housing with at least two housing parts each having fixing locations;
a gearing disposed in said housing;
an electric drive unit driving said gearing and disposed in said housing; and
a vibration-damping element fastening said gearing to at least one of said fixing locations on at least one of said at least two housing parts and preventing direct contact between said gearing and said at least one of said at least two housing parts, said vibration-damping element substantially reducing vibration of said gearing.

25. A household appliance, comprising:
a housing with housing parts each having fixing locations;
a gearing disposed in said housing;
an electric drive unit driving said gearing and disposed in said housing; and
a vibration-damping element fastening said gearing to at least one fixing location on two of said housing parts and preventing direct contact between said gearing and said two housing parts, said vibration-damping element substantially reducing vibration of said gearing.

26. A household appliance, comprising:
a housing having housing parts including:
a first housing part having a first fixing location;
a second housing part having a second fixing location;
a gearing disposed in said housing:
an electric drive unit driving said gearing and disposed in said housing; and
a vibration-damping element fastening said gearing to said first and second fixing locations and preventing direct contact between said gearing and said first and second fixing locations, said vibration-damping element substantially reducing vibration of said gearing.

* * * * *